United States Patent [19]
Osterberg

[11] Patent Number: 5,979,882
[45] Date of Patent: Nov. 9, 1999

[54] DIRECT FLUID SHEAR DAMPER

[75] Inventor: David A. Osterberg, Glendale, Ariz.

[73] Assignee: Honeywell Inc., Minneapolis, Minn.

[21] Appl. No.: 08/968,805

[22] Filed: Nov. 22, 1997

[51] Int. Cl.[6] ....................................................... F16F 9/10
[52] U.S. Cl. .......................... 267/122; 188/276; 188/378; 188/298; 267/221; 267/113
[58] Field of Search ............................ 267/122, 136, 267/221, 140.11, 140.13, 217, 113; 188/298, 378–380, 276; 248/562, 636, 638

[56] References Cited

U.S. PATENT DOCUMENTS

| | | | |
|---|---|---|---|
| 4,760,996 | 8/1988 | Davis | 267/122 |
| 4,848,525 | 7/1989 | Jacot et al. | 188/378 |
| 5,219,051 | 6/1993 | Davis | 188/378 |
| 5,249,783 | 10/1993 | Davis | 188/298 |
| 5,305,981 | 4/1994 | Cunningham et al. | |
| 5,318,156 | 6/1994 | Davis | 188/298 |

Primary Examiner—Douglas C. Butler
Attorney, Agent, or Firm—Thomas A. Rendos

[57] ABSTRACT

Disclosed is a vibration damping and isolation apparatus having a passive damping mechanism. The passive damping mechanism includes an outer tubular member and an inner member. The inner and outer members are linearly movable relative to one another upon application of forces to the damping apparatus. The inner member is spaced from the outer member by a fluid shear gap that is filled with a viscous fluid. Fluid pressure of the viscous fluid remains constant while the viscous fluid dissipates the forces by direct fluid shear upon relative linear movement of the outer and inner members.

22 Claims, 2 Drawing Sheets

DIRECT FLUID SHEAR DAMPER

BACKGROUND OF THE INVENTION

This invention relates to the field of vibration damping and isolation. In particular, the present invention is a passive damping and isolation system that uses direct shear of a viscous fluid to dampen vibration energy.

A precision structural system carrying a load, such as a telescope, is susceptible to disturbances that produce structural vibrations. Such vibrations may be contributed to the structural system by components or assemblies of the system itself. For example, reaction wheel assemblies used to point the telescope. Since such a precision structural system tends to have little inherent damping, these vibrations can lead to serious performance degradation. Therefore, an efficient means of damping and isolating, in a controlled manner, the load carried by a precision structural system is of considerable importance.

Typically, to minimize performance degradation caused by vibrations, passive damping and isolation systems (otherwise known as "fluid dampers") have been used for damping and isolating the load carried by a precision structural system. Present fluid dampers operate by displacing a viscous fluid from one fluid reservoir to another fluid reservoir through a restrictive passage. Shearing of the viscous fluid as it flows through the restrictive passage provides a damping force that is proportional to velocity. This requires that the restrictive passage be relatively long with respect to its cross-section so that the damping force is proportional to velocity, and not due to restrictive passage entrance and exit fluid pressure drops or turbulent to laminar flow regimes. In addition, the mass of the viscous fluid within the restrictive passage must be minimized to prevent non-linear fluid surge effects.

To function properly, one of the fluid reservoirs must be pressurized with respect to the other fluid reservoir to force the viscous fluid to flow from one reservoir to the other through the restrictive passage. This pressurization must be contained by the fluid damper structure for the fluid damper to operate consistently over its useful life. To prevent leakage of the viscous fluid, hermetic seals must be used. These hermetic seals must be designed to withstand the internal fluid pressure of the damper, and may add volumetric compliance to the damping and isolation system. This volumetric compliance may be beneficial in isolation systems but reduces the performance of pure dampers. In addition, since typical rubbing type, hermetic seals add undesirable stiction to the damper, non-stiction hermetic seals, such as bellows, must be incorporated into the fluid damper. These bellows see an internal fluid pressure proportional to velocity making them susceptible to failure under high shock loads. All of these concerns (i.e., viscous fluid flow considerations related to the restrictive passage, fluid seal considerations related to pressurization of the viscous fluid and non-linearities due to fluid mass effects) often drive the design of the damping and isolation system requiring additional system size and weight and/or system complexity.

There is a need for improved damping and isolation systems. In particular, there is a need for a damping and isolation system that will virtually eliminate system design concerns related to the damping force provided by the flow of viscous fluid through the restrictive passage. Moreover, there is a need for a damping and isolation system that will essentially eliminate system operation concerns of viscous fluid leakage related to pressurization of the viscous fluid during operation of the damping and isolation system. The damping and isolation system should surmount these concerns while maintaining a weight, size and complexity efficient structure.

SUMMARY OF THE INVENTION

The present invention is a structural apparatus. The structural apparatus includes a passive damping mechanism having an outer tubular member and an inner member positioned within the outer member. The inner and outer members are linearly movable relative to one another upon application of forces to the structural apparatus. The inner member is spaced from the outer member by a fluid shear gap that is filled with a viscous fluid. Fluid pressure of the viscous fluid remains constant while the viscous fluid dissipates the forces by direct fluid shear upon relative linear movement of the outer and inner members.

This structural apparatus having a passive damping mechanism virtually eliminates concerns of viscous fluid leakage related to pressurization of the viscous fluid during operation of the passive damping mechanism. Viscous fluid leakage concerns have been obviated since the fluid pressure of the viscous fluid remains constant while the viscous fluid dissipates the forces by direct fluid shear upon relative linear movement of the outer and inner members. Moreover, prior art damping system design concerns related to the damping force provided by the flow of viscous fluid through a restrictive passage have been eliminated, since the damping mechanism of the present invention operates via direct fluid shear rather than by the fluid shear resulting from forcing a viscous fluid through a restrictive passage. In addition, this structural apparatus having a passive damping mechanism surmounts these concerns while maintaining a weight, size and complexity efficient structure.

DETAILED DESCRIPTION OF THE PREFERRED EMBODIMENT

Figure 1:
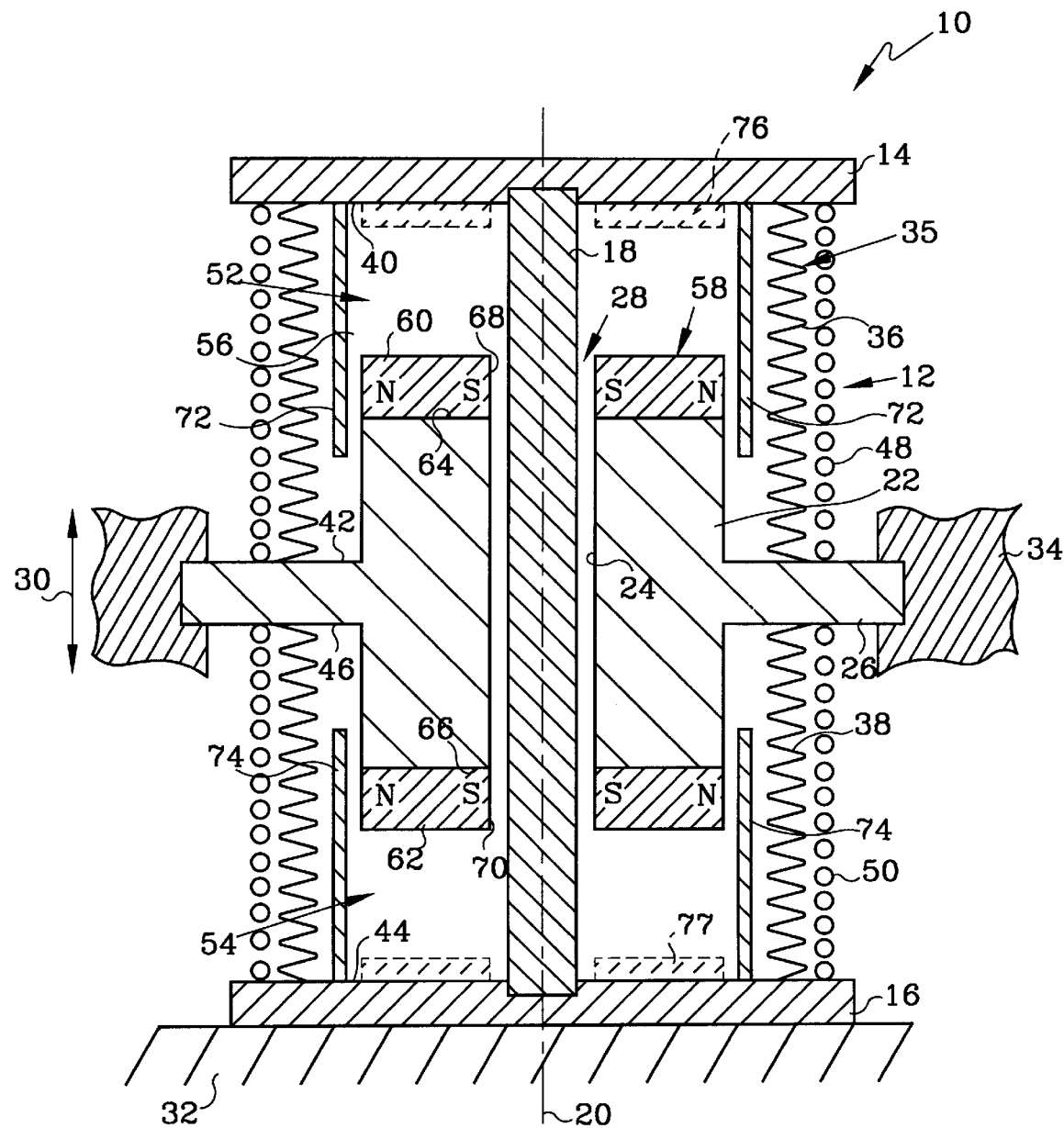
FIG. 1 is a side sectional view of a vibration damping and isolation apparatus in accordance with the present invention.
Figure 2:
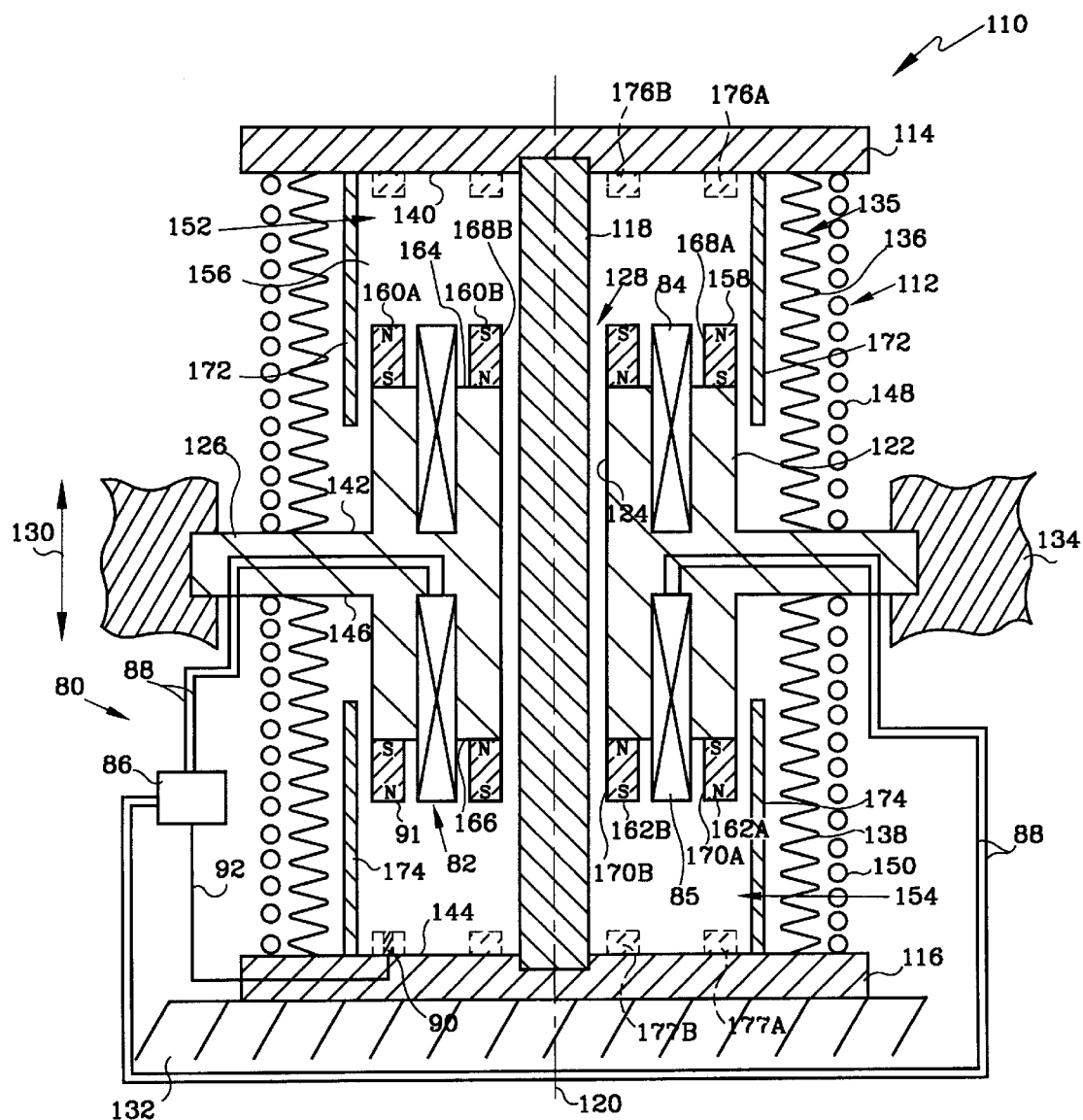
FIG. 2 is a cross sectional view taken along line 2—2 in FIG. 1.
Figure 1:
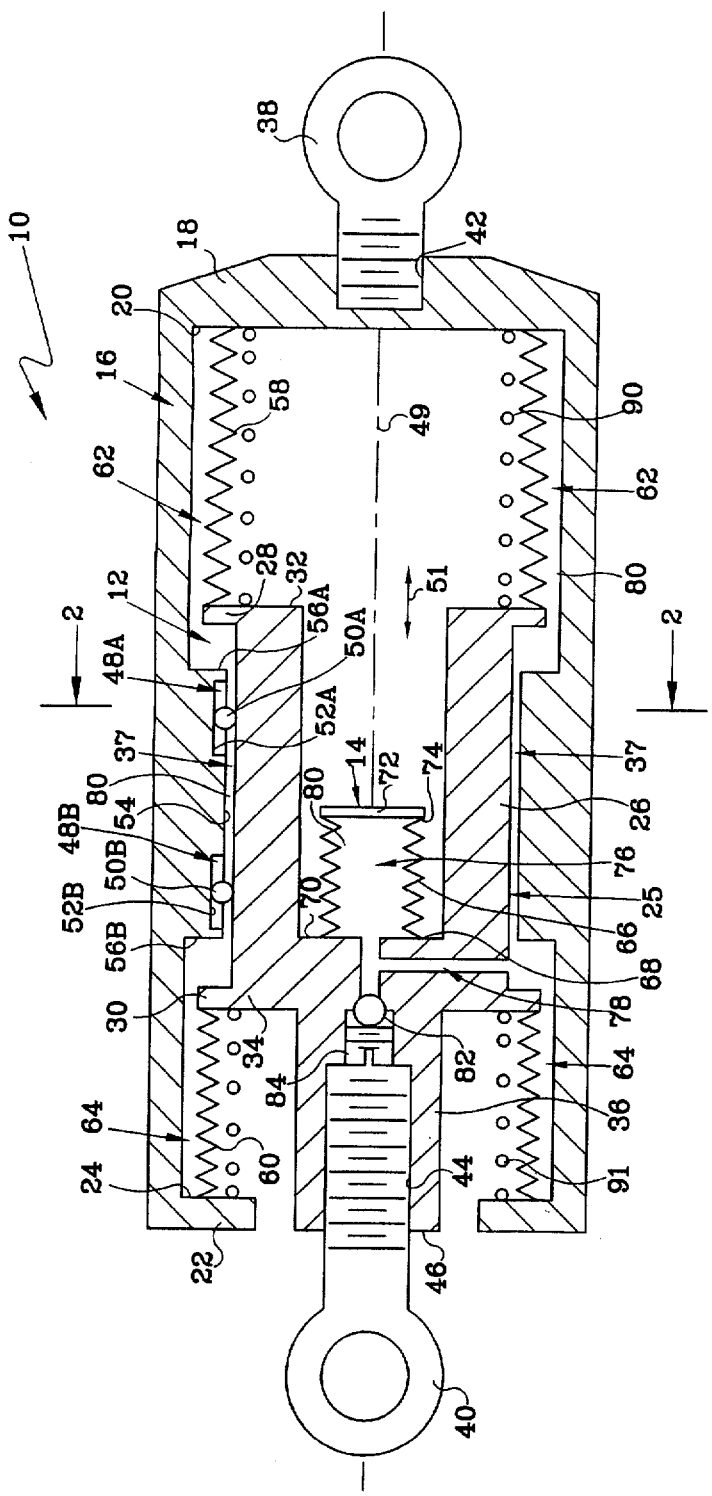

A structural apparatus or strut, such as a vibration damping and isolation apparatus 10 in accordance with the present invention is illustrated in FIGS. 1 and 2. The damping and isolation apparatus 10 comprises a damping mechanism 12 and a thermal compensation mechanism 14. The damping mechanism 12 includes an outer tubular member 16 having an end cap 18 at a first end 20 and an inwardly extending radial flange 22 at a second end 24. The damping mechanism 12 further includes an inner member 25 defined by an inner tubular segment 26 having first and second outwardly extending radial flanges 28 and 30 at first and second end portions 32 and 34, respectively. The inner member 25 is further defined by an inner cylindrical shaft segment 36 that extends axially outwardly from the second end portion 34 of the inner tubular segment 26. The inner tubular segment 26 of the inner member 25 is spaced from the outer tubular member 16 by a fluid shear gap 37. First and second end fittings 38 and 40 are threadably received within threaded openings 42 and 44 of the end cap 18 of the outer tubular member 16 and free end 46 of the inner shaft segment 36, respectively. The end fittings 38 and 40 permit adaptation of the damping and isolation apparatus 10 to a structure, such as a truss structure. Typically, the end fitting 40 is secured to ground while the end fitting 38 is secured to a payload or like structure.

As seen in FIGS. 1 and 2, the passive damping mechanism 12 further includes a suspension device, such as first and second spaced roller mechanisms 48A and 48B, respectively. The first and second roller mechanisms 48A and 48B are located between the outer tubular member 16 and the inner tubular segment 26 and permit the outer member 16 and the inner member 25 to be linearly movable (as represented by double headed arrow 51) relative to one another along a longitudinal axis 49 of the damping and isolation apparatus 10. This relative linear movement of the outer and inner members 16 and 25 occurs upon application of forces, such as vibration and shock forces to the damping and isolation apparatus 10. The first and second roller mechanisms 48A and 48B each include three roller elements, such as balls 50A and 50B, which contact both the outer tubular member 16 and the inner tubular segment 26 of the inner member 25. Each of the balls 50A and 50B is held within and is movable along its own slot 52A and 52B on an inner surface 54 of the outer tubular member 16. The slots 52A and 52B are arranged parallel to the longitudinal axis 49 of the damping and isolation apparatus 10. In addition, the slots 52A and 52B, and therefore the balls 50A and 50B, are equally spaced (i.e., 120° apart) about the circumference of the inner surface 54. Relative linear movement of the outer and inner members 16 and 25 is stroke limited by the first and second outwardly extending flanges 28 and 30 of inner tubular segment 26 contacting ends (i.e., stops) 56A and 56B, respectively, of the slots 52A and 52B.

In addition to permitting relative linear movement of the outer and inner members 16 and 25, the first and second roller mechanisms 48A and 48B also maintain the inner member 25 concentric with the outer member 16 so as to maintain the fluid shear gap 37 between the outer member 16 and the tubular segment 26. The first and second roller mechanisms 48A and 48B suspend the inner member 25 within the outer tubular member 16 to allow the outer and inner members 16 and 25 to linearly roll with a minimum of stiction, and to allow tight tolerancing and alignment of the inner member 25 within the outer tubular member 16. The first roller mechanism 48A is spaced from the second roller mechanism 48B is minimize misalignment of the inner and outer members 16 and 25.

As seen in FIG. 1, the passive damping mechanism 12 of the damping and isolation apparatus 10 further includes first and second resilient fluid seal bellows 58 and 60 for coupling the inner member 25 to the outer tubular member 16. The first resilient fluid seal bellows 58 forms a hermetic seal between the end cap 18 at the first end 20 of the outer tubular member 16 and the first outwardly extending radial flange 28 at the first end portion 32 of the tubular segment 26. The second resilient fluid seal bellows 60 forms a hermetic seal between the inwardly extending radial flange 22 at the second end 22 of the outer tubular member 16 and the second outwardly extending radial flange 30 at the second end portion 34 of the tubular segment 26. The resiliency of the first and second bellows 58 and 60 permits relative linear movement of the outer and inner members 16 and 25, and the resiliency acts to center (this position being illustrated in FIG. 1) the inner member 25 with regard to the outer tubular member 16. A first spring 90 mounted between the end cap 18 and the first end portion 32, and a second spring 91 mounted between the inwardly extending radial flange 22 and the second end portion 34 may be added to increase the axial stiffness and centering force created by the bellows 58 and 60. The areas between the first and second bellows 58 and 60 and the outer tubular member 16 define first and second fluid chambers 62 and 64 to either side of the fluid shear gap 37. The effective areas of the first and second bellows 58 and 60 are selected to have the same displaced volume as the outer diameter of the inner tubular segment 26 of the inner member 25. This prevents any volumetric changes between the fluid chambers 62 and 64 when the inner member 25 is displaced relative to the outer tubular member 16 and prevents pressure changes between the fluid chambers 62 and 64 and the flow of fluid through the fluid shear gap 37.

As seen in FIG. 1, the thermal compensation mechanism 14 of the damping and isolation apparatus 10 includes a resilient fluid seal bellows 66 located within the inner tubular segment 26 of the inner member 25. A first end 68 of the bellows 66 of the thermal compensation mechanism 14 is coupled to an end wall 70 of the inner member 25. A bellows plug 72 is secured to a second end 74 of the bellows 66. The bellows 66 of the thermal compensation mechanism 14 defines a thermal compensation fluid chamber 76 that communicates with the fluid shear gap 37 and the first and second fluid chambers 62 and 64 through a fluid flow orifice 78 extending through the inner member 25.

A suitable, substantially incompressible viscous fluid 80, such as a damping silicon fluid, is applied through a fill port 82 (located at the bottom of the threaded opening 44 in the inner shaft segment 36 of the inner member 25) to fill the fluid shear gap 37, first and second fluid chambers 62 and 64, thermal compensation fluid chamber 76 and orifice 78. The viscous fluid 80 is applied through the fill port 82 after the fluid shear gap 37, first and second fluid chambers 62 and 64, thermal compensation fluid chamber 76 and orifice 78 have been evacuated. Once filled with viscous fluid 80, the fill port 82 is then sealed by a plug 84 and the end fitting 40 is secured within threaded opening 44. In practice, the bellows 66 of the thermal compensation mechanism 14 expands and contracts to compensate for the thermal expansion and contraction of the viscous fluid 80 due to changes in temperature. By compensating for thermal expansion and contraction of the viscous fluid 80, the thermal compensation mechanism 14 insures that the fluid pressure of the fluid 80 remains constant irrespective of temperature changes.

In operation, when vibration and shock forces are applied to the damping and isolation apparatus 10, the outer tubular member 16 and the inner member 25 move linearly, opposite to one another along the axis 49. This opposite linear movement causes direct fluid shear of the viscous fluid 80 within the fluid shear gap 37 between the outer tubular member 16 and the inner tubular segment 26. During this opposite linear movement of the outer and inner members 16 and 25, the fluid pressure of the viscous fluid 80 remains constant (i.e., does not increase or decrease). This direct fluid shear is due to the viscous drag of the fluid 80 which creates an opposing force, to the vibration and shock forces, which is a very linear function of velocity and purely dissipative. This results in damping which can be controlled by changing the dimensions of the fluid shear gap 37 and/or the viscosity of the viscous fluid 80. The first and second bellows 58 and 60 and thermal compensation bellows 66 provide static stiffness which can be appropriately set by selecting the material for the bellows 58, 60 and 66, the thickness of the material and the number and/or dimensions of the convolutes or through the addition of the first and second springs 90 and 91.

In one preferred embodiment, the damping and isolation apparatus 10 has a length of 12" (hence, the reason for omitting a center portion of the apparatus 10 in FIG. 1) and a diameter of 1.25". The damping stroke of the damping and isolation apparatus 10 is ±0.25" and the fluid shear gap 37 has a width of 0.002". In the one preferred embodiment, the outer and inner members 16 and 25 are both manufactured of the same material (i.e., aluminum). However, alternatively, the outer tubular member 16 can be formed of a first material having a first coefficient of thermal expansion (CTE) and the inner member 25 can be formed of a second material having a second CTE that is different than the first CTE, such that upon temperature changes, the first and second materials of the outer and inner members 16 and 25, respectively, expand and contract at different rates thereby changing the dimensions of the fluid shear gap 37 to compensate for changes in viscosity of the viscous fluid 80 also due to temperature changes. For example, in this alternative embodiment, the outer tubular member 16 can be manufactured of steel, such as 440 C. steel, having a CTE of 5.6E–06 in./in.-°F. while the inner member 25 is manufactured of aluminum having a CTE of 12.4E–06 in./in.-°F.

This damping and isolation apparatus 10 having a passive damping mechanism 12 virtually eliminates concerns of viscous fluid 80 leakage related to pressurization of the viscous fluid 80 during operation of the damping apparatus 10. Viscous fluid 80 leakage concerns have been obviated since the fluid pressure of the viscous fluid 80 remains constant in fluid chambers 62 and 64, due to careful selection of geometry's, while the viscous fluid 80 dissipates the vibration and shock forces by direct fluid shear upon relative linear movement of the outer and inner members 16 and 25. Thus, high shock loads across the damping and isolation apparatus 10 do not pressurize the bellows 58 and 60 and non-linearities due to fluid mass effects are minimized. Moreover, prior art damping system design concerns related to the damping force provided by the flow of viscous fluid through a restrictive passage have been eliminated, since the damping and isolation apparatus 10 in accordance with the present invention operates via direct fluid shear rather than by the fluid shear resulting from forcing a viscous fluid through a restrictive passage. In addition, this damping and isolation apparatus 10 surmounts these concerns while maintaining a weight, size and complexity efficient structure.

Although the present invention has been described with reference to preferred embodiments, workers skilled in the art will recognize that changes may be made in form and detail without departing from the spirit and scope of the invention.

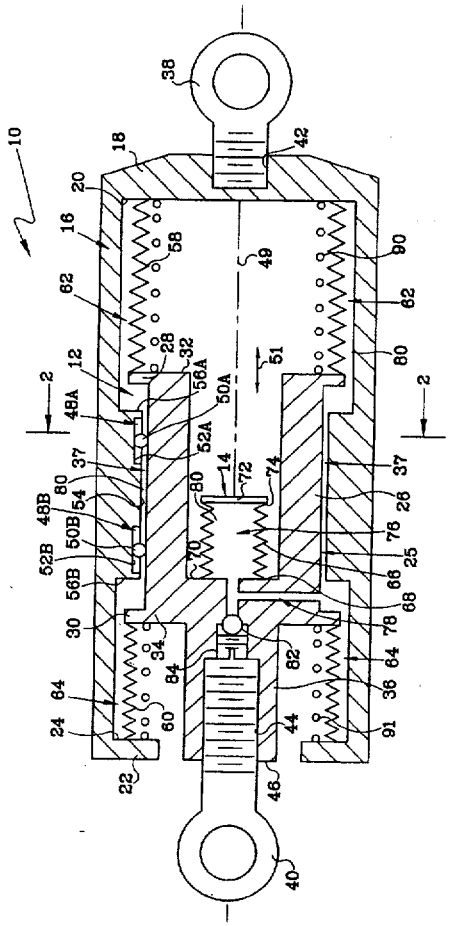

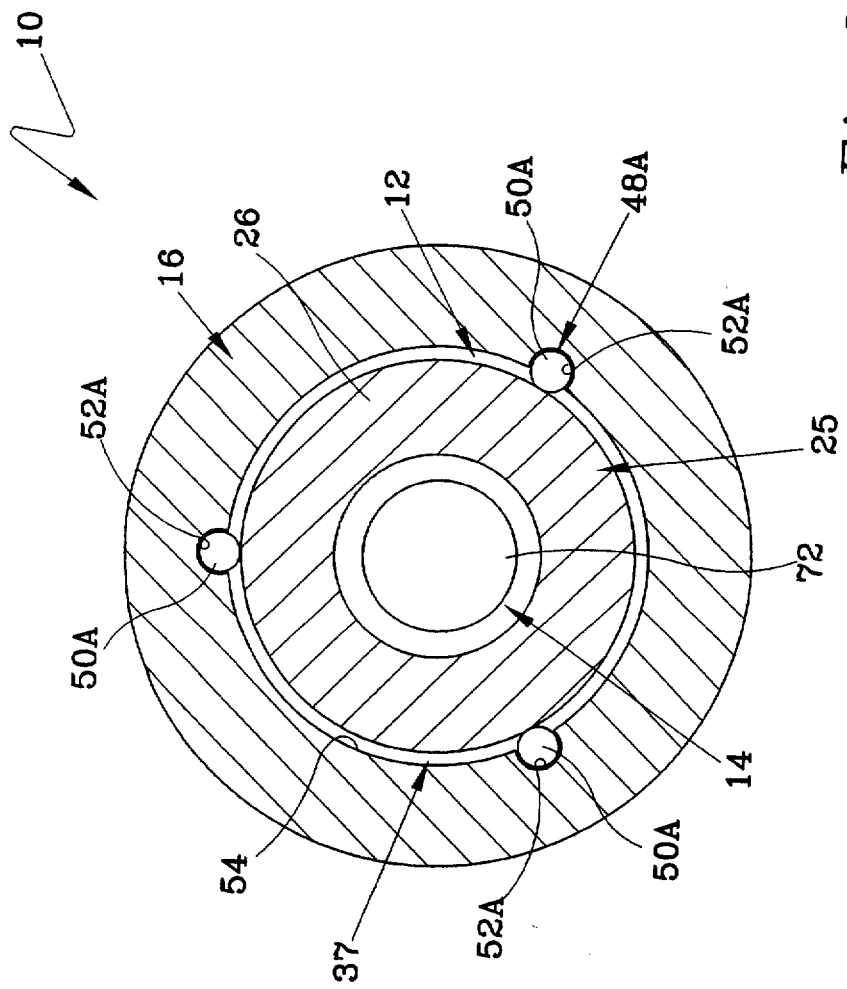

I claim:

1. A structural apparatus, comprising:
   a passive damping mechanism, including:
      an outer tubular member;
      an inner member within the outer member, the inner and outer members being linearly movable relative to one another upon application of forces to the structural apparatus, the inner member being spaced from the outer member by a fluid shear gap; and
      a viscous fluid filling the fluid shear gap, fluid pressure of the viscous fluid remaining constant while the viscous fluid dissipates the forces by direct fluid shear upon relative linear movement of the outer and inner members.

2. The structural apparatus of claim 1 wherein the passive damping mechanism further includes resilient seal means for coupling the inner member to the outer member and for permitting relative linear movement of the inner and outer members.

3. The structural apparatus of claim 2 wherein the resilient seal means includes:
   a first resilient fluid seal that couples a first end of the inner member to a first end of the outer member; and
   a second resilient seal that couples a second end of the inner member to a second end of the outer member.

4. The structural apparatus of claim 3 wherein the first and second resilient fluid seals are first and second resilient bellows.

5. The structural apparatus of claim 3 wherein the inner member includes:
   a inner tubular segment spaced from the outer tubular member to define the fluid shear gap, a first end portion of the inner tubular segment corresponding to the first end of the inner member and a second end portion of the inner tubular segment corresponding to the second end of the inner member; and
   a inner cylindrical shaft segment extending outwardly from the second end portion of the inner tubular segment.

6. The structural apparatus of claim 5 wherein the passive damping mechanism further includes a suspension means for maintaining the inner tubular segment concentric with the outer tubular member and for maintaining the fluid shear gap between the outer tubular member and the inner tubular segment.

7. The structural apparatus of claim 6 wherein the suspension means includes a plurality of roller elements positioned between the outer tubular member and the inner tubular segment to permit relative linear movement of the outer tubular member and the inner tubular segment.

8. The structural apparatus of claim 7 wherein the roller elements are balls.

9. The structural apparatus of claim 6 wherein the suspension means includes first and second spaced roller mechanisms positioned between the outer tubular member and the inner tubular segment to permit relative linear movement of the outer tubular member and the inner tubular segment.

10. The structural apparatus of claim 9 wherein each of the first and second roller mechanisms includes a plurality of roller elements contacting the outer tubular member and the inner tubular segment, the plurality of roller elements being held within and movable along a plurality of slots on an inner surface of the outer tubular member.

11. The structural apparatus of claim 10 wherein the plurality of roller elements of each of the first and second roller mechanisms comprises at least three balls equally spaced about the circumference of the inner surface of the outer tubular member.

12. The structural apparatus of claim 11 wherein each ball is positioned within its own slot.

13. The structural apparatus of claim 1 wherein the passive damping mechanism further includes a suspension means for maintaining the inner member concentric with the outer tubular member and for maintaining the fluid shear gap between the inner and outer members.

14. The structural apparatus of claim 13 wherein the suspension means includes first and second spaced roller mechanisms positioned between the outer tubular member and the inner member to permit relative linear movement of the outer and inner members.

15. The structural apparatus of claim 14 wherein each of the first and second roller mechanisms includes a plurality of roller elements contacting the outer and inner members, the plurality of roller elements being held within and movable along a plurality of slots on an inner surface of the outer tubular member.

16. The structural apparatus of claim 15 wherein the plurality of roller elements of each of the first and second roller mechanisms comprises at least three balls equally spaced about the circumference of the inner surface of the outer tubular member.

17. The structural apparatus of claim 1, and further including a temperature compensation mechanism that acts on the passive damping mechanism to maintain constant fluid pressure within the passive damping mechanism through the effects of temperature changes on the structural apparatus.

18. The structural apparatus of claim 17 wherein the temperature compensation mechanism includes a resilient fluid bellows defining a fluid chamber having viscous fluid therein, the fluid chamber being in fluid contact with the fluid shear gap.

19. The structural apparatus of claim 1 wherein the outer tubular member is formed of a first material having a first coefficient of thermal expansion and the inner member is formed of a second material having a second coefficient of thermal expansion that is different than the first coefficient of thermal expansion, such that upon temperature changes, the first and second materials of the outer and inner members, respectively, expand and contract at different rates thereby changing dimensions of the fluid shear gap to compensate for changes in viscosity of the viscous fluid also due to temperature changes.

20. The structural apparatus of claim 1 wherein forces are vibration and shock forces and the structural apparatus is a vibration damping and isolation apparatus for dissipating vibration and shock forces.

21. The structural apparatus of claim 5 wherein the first and second fluid seals define first and second fluid reservoirs to either side of the fluid shear gap, the first and second fluid reservoirs being in fluid contact with the fluid shear gap, with the effective volumes of the first and second reservoirs having substantially the same displaced volume as an outer diameter of the inner tubular segment to prevent viscous fluid flow from the first and second reservoirs during linear relative movement of the inner and outer members thereby eliminating pressurization of the first and second seals.

22. The structural apparatus of claim 3, and further including:
   a first spring positioned between a first end of the inner member and a first end of the outer member; and
   a second spring positioned between a second end of the inner member and a second end of the outer member, the first and second springs increasing the static stiffness of the structural apparatus.

* * * * *

UNITED STATES PATENT AND TRADEMARK OFFICE
CERTIFICATE OF CORRECTION

PATENT : 5,979,882

DATED : November 9, 1999

INVENTOR(S): David A. Osterberg

It is certified that error appears in the above-identified patent and that said Letters Patent is hereby corrected as shown below:

The title page, showing the illustrative figure should be deleted and to be replaced with the attached title page.

In the drawings, Sheets 1 and 2, consisting of Figs. 1 and 2, should be deleted and replace the corrected Sheets 1 and 2, consisting of Figs. 1 and 2, as shown on the attached pages.

Signed and Sealed this

Twenty-sixth Day of December, 2000

Attest:

Q. TODD DICKINSON

*Attesting Officer*       *Director of Patents and Trademarks*

United States Patent [19]
Osterberg

[11] Patent Number: 5,979,882
[45] Date of Patent: Nov. 9, 1999

[54] DIRECT FLUID SHEAR DAMPER

[75] Inventor: David A. Osterberg, Glendale, Ariz.

[73] Assignee: Honeywell Inc., Minneapolis, Minn.

[21] Appl. No.: 08/968,805

[22] Filed: Nov. 22, 1997

[51] Int. Cl.$^6$ .................................................. F16F 9/10
[52] U.S. Cl. ........................ 267/122; 188/276; 188/378; 188/298; 267/221; 267/113
[58] Field of Search ............................. 267/122, 136, 267/221, 140.11, 140.13, 217, 113; 188/298, 378–380, 276; 248/562, 636, 638

[56] References Cited

U.S. PATENT DOCUMENTS

| | | | |
|---|---|---|---|
| 4,760,996 | 8/1988 | Davis | 267/122 |
| 4,848,525 | 7/1989 | Jacot et al. | 188/378 |
| 5,219,051 | 6/1993 | Davis | 188/378 |
| 5,249,783 | 10/1993 | Davis | 188/298 |
| 5,305,981 | 4/1994 | Cunningham et al. | |
| 5,318,156 | 6/1994 | Davis | 188/298 |

Primary Examiner—Douglas C. Butler
Attorney, Agent, or Firm—Thomas A. Rendos

[57] ABSTRACT

Disclosed is a vibration damping and isolation apparatus having a passive damping mechanism. The passive damping mechanism includes an outer tubular member and an inner member. The inner and outer members are linearly movable relative to one another upon application of forces to the damping apparatus. The inner member is spaced from the outer member by a fluid shear gap that is filled with a viscous fluid. Fluid pressure of the viscous fluid remains constant while the viscous fluid dissipates the forces by direct fluid shear upon relative linear movement of the outer and inner members.

22 Claims, 2 Drawing Sheets